United States Patent [19]

Smith

[11] Patent Number: 5,150,581
[45] Date of Patent: Sep. 29, 1992

[54] HEAD PRESSURE CONTROLLER FOR AIR CONDITIONING AND REFRIGERATION SYSTEMS

[75] Inventor: Glenn W. Smith, Mt. Airy, Md.

[73] Assignee: Baltimore Aircoil Company, Baltimore, Md.

[21] Appl. No.: 720,023

[22] Filed: Jun. 24, 1991

[51] Int. Cl.⁵ ............................................. F25B 39/04
[52] U.S. Cl. ..................................... 62/115; 62/184; 62/DIG. 17
[58] Field of Search ............... 62/184, 228.3, DIG. 17, 62/115

[56] References Cited

U.S. PATENT DOCUMENTS

| | | | |
|---|---|---|---|
| 4,326,387 | 4/1982 | Friedman | 62/184 |
| 4,516,914 | 5/1985 | Murphey et al. | 417/282 |
| 4,555,910 | 12/1985 | Sturges | 62/184 |

OTHER PUBLICATIONS

W. F. Stoecker, Industrial Refrigeration, 1988, pp. 112–114 (S 5–3 Performance Basic Screw Compressor).

Primary Examiner—William E. Wayner
Attorney, Agent, or Firm—Edward J. Brosius; F. S. Gregorczyk

[57] ABSTRACT

The present invention describes a method of controlling the head pressure in a refrigeration or air conditioning system in order to maintain the internal discharge pressure and discharge line pressure substantially equal. The method consists of the steps of measuring the suction pressure of the working fluid, calculating the internal discharge pressure of the working lfuid by multiplying the suction pressure by the internal pressure ratio of the compressor, measuring the discharge line pressure of the working fluid and then comparing the internal discharge pressure to the discharge line pressure. If the difference between the internal discharge pressure and discharge line pressure is greater than some allowable tolerance, the capacity of the condenser is adjusted to equalize these two pressures.

12 Claims, 7 Drawing Sheets

HEAD PRESSURE CONTROLLER FOR AIR CONDITIONING AND REFRIGERATION SYSTEMS

FIELD OF THE INVENTION

This invention relates to a method and apparatus for controlling the head pressure in refrigeration and air conditioning systems. More specifically, this invention is intended to control the condenser capacity in such a way as to maintain the condensing pressure or discharge line pressure approximately equivalent to the internal compressor discharge pressure.

BACKGROUND OF THE INVENTION

Screw compressors are commonly used in air conditioning and refrigeration systems. It is well known that screw compressors, along with rotary vane compressors and the more recently introduced scroll compressors, are constant volume ratio compressors. For screw compressors, the internal volume ratio, $V_i$, is defined as the volume of uncompressed vapor in one groove of the compressor before compression begins divided by the volume of the compressed vapor in the groove just prior to the uncovering of the discharge port. This ratio is fixed during the manufacture of the machine by the size of the compressor grooves and the location of the suction and discharge ports of the compressor.

Since screw compressors are constant volume ratio machines, they are also constant pressure ratio, $P_i$, machines. Assuming isentropic compression, the volume ratio is related to the pressure ratio by the following equation:

$$V_i^k = P_i = \frac{P_d}{P_s}$$

where:
 $k$ = the isentropic exponent of the refrigerant being used
 $P_d$ = the internal discharge pressure of the screw compressor
 $P_s$ = the suction pressure of the screw compressor As can be seen from the above relationship, for a given refrigerant, the screw compressor internal discharge pressure, $P_d$, is dependant only on the built in volume ratio, $V_i$ and suction pressure, $P_s$. Thus, in systems utilizing a compressor with a constant internal volume ratio and where the suction pressure is held constant, the internal discharge pressure will also remain constant.

It is important to note that while the relationship shown above for $V_1$ and $P_i$ is correct for isentropic compression, it is recognized that screw compressors do not perform in a pure isentropic fashion. The vapor being compressed within the grooves of the compressor is cooled to some degree by the oil injected injected into the compressor. In addition, the grooves of the compressor are not perfectly sealed which allows a small portion of the refrigerant to blow-through, or leak out of, the grooves during compression. As a result, the ideal pressure ratio is not achieved. This change of pressure can be determined from the adiabatic compressor efficiency of the compressor and a correction factor applied to obtain the "ideal" pressure ratio.

It is well known that for the most economical operation, the internal discharge pressure of the screw compressor should equal the pressure of the refrigerant within the line into which the screw compressor discharges. This is referred to as ideal compression. However, in many cases where the internal discharge pressure remains relatively constant, ideal compression is not achieved due to changes in the condensing pressure and hence, the discharge line pressure. The discharge line pressure can be considered equal to the condensing pressure in most applications because the only difference in these two pressures is the relatively small pressure loss which occurs in the line between the outlet of the compressor and the inlet of the condenser. As a result, the discharge line pressure will vary directly with the condensing pressure.

The condensing pressure at which a condenser will operate depends upon a number of factors such as the design conditions for which the condenser was selected, the actual conditions at which the condenser is operating, and whether the condenser is operating at full or partial capacity. In many cases, condenser operations in refrigeration and air conditioning systems are operated at full capacity at all times. In these situations, the pressure at which the condenser operates will fluctuate as changes occur in the ambient conditions such as outside air temperature or humidity. Because of these condensing pressure fluctuations, refrigeration or air conditioning systems utilizing screw compressors typically operate where the internal discharge pressure of the compressor does not equal the condensing or discharge line pressure resulting in a condition of either "over-compression" or "under-compression".

In the under-compression case, the internal discharge pressure is less than the discharge line pressure. Energy is wasted because the compressor must work against this higher pressure from the time the discharge port is uncovered until all gas is pushed out of the cavity. In the over-compression case, the internal discharge pressure is greater than the discharge line pressure. Energy is wasted in this case when the condenser needlessly operates at full capacity, thereby keeping the discharge line pressure low, when operation at less than full capacity would be sufficient.

PRIOR ART

In the past, screw compressors were selected with an internal volume ratio that would most closely match the expected system evaporating and condensing pressures. In many applications, the evaporator load and suction pressure would remain relatively constant but a fluctuation would occur in the ambient conditions such as outside air temperature or outside air relative humidity. Typically, condensing capacity was maintained at the maximum and the condensing pressure was allowed to fluctuate with the ambient conditions. This would result in the discharge line pressure varying while the internal discharge pressure remained constant; which, in turn would cause the over or under compression conditions described above.

U.S. Pat. No. 4,516,914 disclosed an apparatus to change the internal volume ratio of the screw compressor while the compressor is operating. This change in the internal volume ratio was effected by relocating the discharge port of the compressor during operation. Since the internal discharge pressure is directly related to the internal volume ratio, by changing the internal volume ratio, this system could control the internal discharge pressure of the compressor during operation to allow it to match the discharge line pressure. This system came to be known to those skilled in the art as "Variable Volume Ratio Control."

In systems utilizing a compressor supplied with variable volume ratio control, the condenser operations are typically run at full capacity and the discharge line pressure is allowed to fluctuate with ambient conditions. However, the internal discharge pressure of the compressor is controlled to match the current discharge line pressure. The condensing capacity is normally not reduced until the discharge line pressure reaches the minimum allowable for the system, which minimum is usually based upon what is required for proper liquid feed or oil circulation.

The variable volume ratio control system saves energy by matching the internal discharge pressure to the discharge line pressure, thereby minimizing the conditions of over and under-compression. In addition, it allows the same compressor to be efficiently used as a "swing" machine on different systems. However, there is still significant room for improvement in this area.

For example, the lowest internal volume ratio that the variable volume ratio control system can provide is not small enough in many applications where the ambient or outdoor temperature, and thus discharge line pressure, can approach very low levels. In these applications, the internal discharge pressure can not be reduced enough by the variable volume ratio control system to allow it to match the low discharge line pressure. This results in over-compression which is energy wasteful.

Also, the variable volume ratio system can only be provided on new machines because the system must be built into the compressor. The fact that the variable volume ratio control system can not be retrofit on any existing screw compressor machines severely restricts the usefulness of this system.

Further, the variable volume ratio system is complex and results in the addition of many more mechanical parts to the screw compressor machine.

SUMMARY OF THE INVENTION

The present invention provides a method and apparatus for controlling the discharge line pressure in an air conditioning or refrigeration system.

It is an object of the present invention to provide a method and apparatus to control the capacity of the condenser operations in air conditioning or refrigeration systems such that the discharge line pressure and the compressor internal discharge pressure are maintained substantially equal.

Briefly stated, the present invention operates by measuring the suction pressure of the working fluid just prior to its entrance into the compressor. The internal discharge pressure of the compressor is then calculated from this suction pressure and from the internal pressure ratio of the compressor. The discharge line pressure is then measured and compared to the internal discharge pressure of the compressor. If the discharge line pressure and the internal discharge pressure of the compressor are substantially equal, no changes are made to the system. However, if these pressures are not equal, the condenser capacity is either increased or decreased depending upon whether the internal discharge pressure of the compressor is greater than or less than the discharge line pressure.

If the internal discharge pressure is greater than the discharge line pressure, a condition of over-compression exists and the present invention saves condenser energy by decreasing the capacity of the condenser until the discharge line pressure increases to match the internal discharge pressure of the compressor. If the internal discharge pressure of the compressor is less than the discharge line pressure, a condition of under-compression exists and the present invention saves compressor energy by increasing the condensing capacity until the discharge line pressure decreases to match the internal discharge pressure of the compressor. The amount of energy saved at the compressor in the under-compression case will be greater than that required to increase the condensing capacity. Thus, the present invention provides energy savings when the compressor is either operating at an over- or under-compression condition by changing the discharge line pressure to have it be substantially equal to the internal discharge pressure.

DETAILED DESCRIPTION

Figure 1:
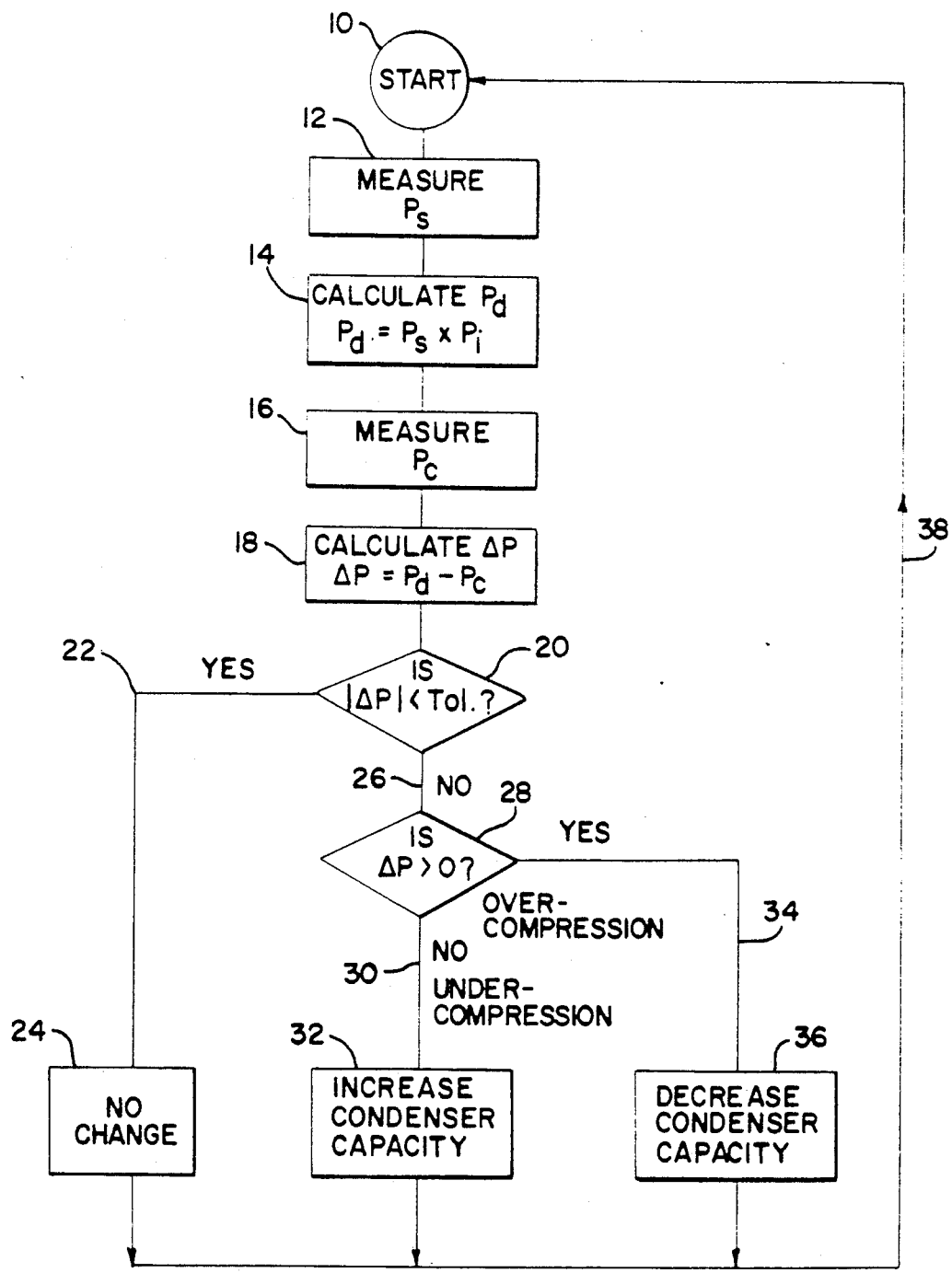
FIG. 1 is a flow chart block diagram illustrating the control logic of the present invention.

Referring now to FIG. 1, there is shown a flow chart block diagram displaying the preferred embodiment of the control logic of the present invention. The control logic start point 10 signifies the beginning of the control sequence. In block 12, the suction pressure, Ps, is measured. In block 14, the internal discharge pressure is calculated by multiplying the suction pressure by the internal pressure ratio. The condensing pressure, or discharge line pressure, Pc is measured in block 16. In block 18, the difference between the internal discharge pressure and the discharge line pressure is calculated and is shown as $\Delta P$. Block 20 is a decision block wherein a comparison is made between the absolute value of $\Delta P$ and a pre-set tolerance that has been manually inputted to and stored in the controller. If the absolute value of $\Delta P$ is less than the tolerance, the logic follows path 22 which leads to block 24 in which no change to the condenser capacity is made. The logic then follows path 38 back to the start 10 of the control sequence.

If in block 20, the absolute value of $\Delta P$ is greater than the tolerance, then the logic follows path 26 which leads to a second decision block 28. In decision block 28, a determination is made as to whether the difference between the internal discharge pressure and discharge line pressure, $\Delta P$, is greater than zero. If the answer is no, a condition of under-compression exists and the logic follows path 30 to block 32 wherein the condenser capacity is increased. Upon leaving block 32 the logic follows path 38 back to the start 10 of the control sequence. If, however, in decision block 28, the answer is yes and ΔP is greater than zero, a condition of over-compression exists and the logic follows path 34 to block 36 wherein the condenser capacity is decreased. Upon leaving block 36, the logic follows path 38 back to the start 10 of the control sequence.

Figure 2:
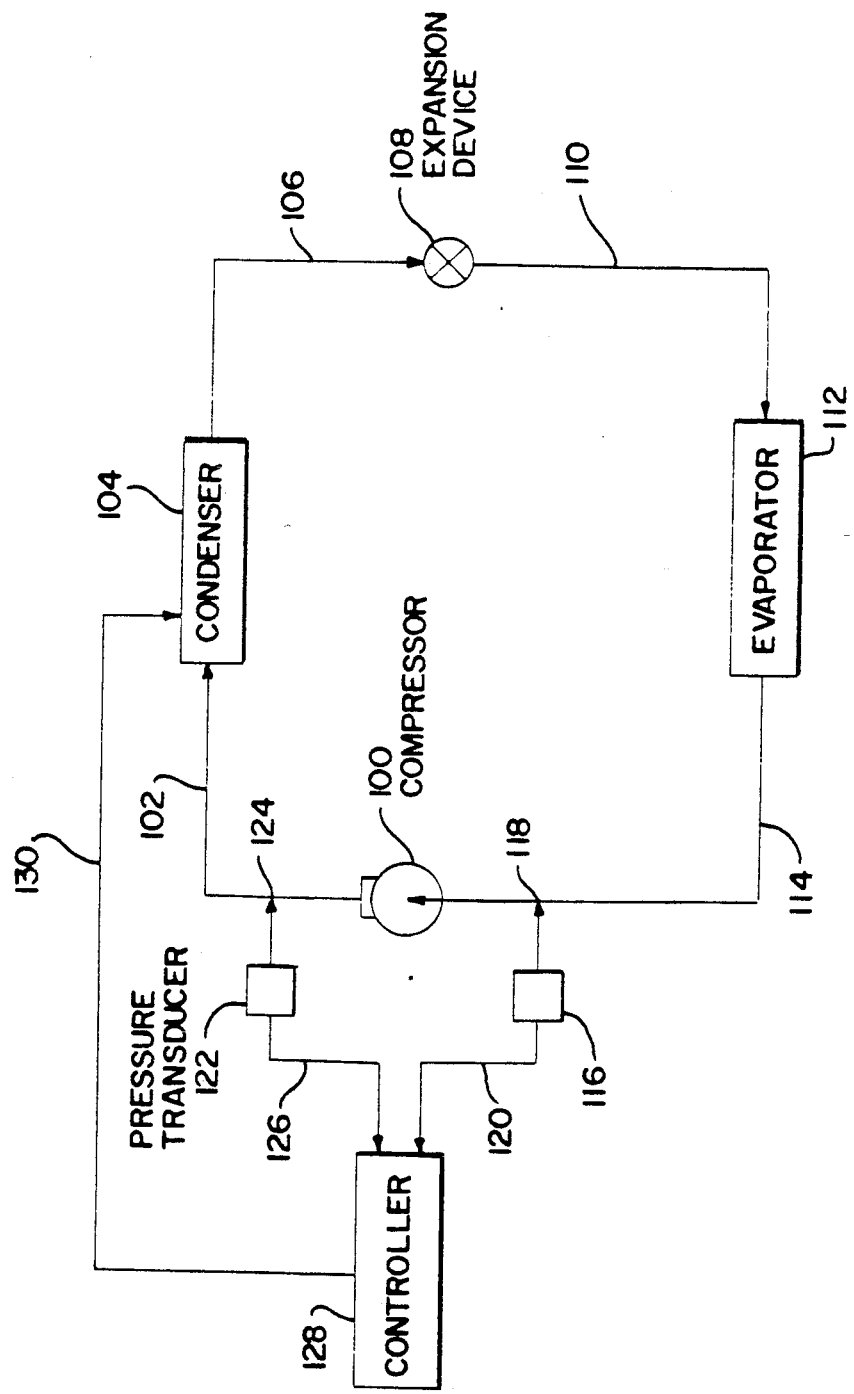
FIG. 2 is a schematic diagram showing the configuration of a typical air conditioning or refrigeration system utilizing the present invention.

The apparatus required in the present invention is show schematically in FIG. 2. The typical refrigeration or air conditioning system consists of a compressor 100, which could be a screw, rotary vane or scroll compressor. Compressor 100 has an outlet which is connected via conduit 102 to the inlet of condenser 104. The condenser 104 could be an evaporative condenser, a water cooled condenser with cooling water supplied by a cooling tower, an air cooled condenser, or other condensing device. Condenser 104 has an outlet which is connected via conduit 106 to an expansion device 108, which usually is a thermostatic expansion valve but which could be an alternative expansion device such as an orifice, capillary tubes or other type of expansion device. Expansion device 108 has an outlet which is connected via conduit 110 to the inlet of evaporator 112. The outlet of evaporator 112 is connected via conduit 114 to the inlet of compressor 100 thereby completing the circuit. A working fluid, most typically a gaseous refrigerant, is contained in and flows through this circuit.

In addition to the basic refrigeration or air conditioning system described above, the present invention also requires the use of two pressure sensing devices 116 and 122 and a controller 128. Pressure sensing devices 116 and 122 are typically pressure transducers which function to hydraulically or pneumatically sense the pressure of a fluid, transduce this physical pressure measurement into an electrical signal and transmit this electrical signal, representing the sensed pressure, to a suitable receiving device such as controller 128.

In the present invention, pressure sensing device 116 measures the working fluid suction pressure at location 118 and transmits an electrical signal representing this pressure measurement to controller 128 via line 120. The second pressure sensing device 122 measures the discharge line pressure at location 124 and transmits an electrical signal representing this pressure measurement to controller 128 via line 126

Depending upon the signals received from pressure sensing devices 116 and 122 and the calculated internal discharge pressure of the compressor, controller 128 may output a signal via line 130 to condenser 104 to either increase or decrease the capacity of condenser 104. This change in condensing capacity could be achieved in several different ways such as increasing or decreasing the condenser o cooling tower fan motor speed, cycling the condenser or cooling tower fans on and off, cycling the evaporative condenser spray water pump on and off, adjusting the position of the condenser or cooling tower fan dampers, cycling off entire condenser units in a multiple cell installation or combinations of the above.

One of the many possible applications for the present invention would be for controlling the head pressure of a refrigeration system which is used to provide cooling to a process. These refrigeration systems often used multiple stage, twin screw, axial flow screw compressors and multiple cell evaporative condensers with various means to control condensing capacity as described above. In many cases the refrigeration load remains relatively constant but the ambient conditions, and hence the condensing pressure and discharge line pressure, vary throughout the day.

Figure 3:
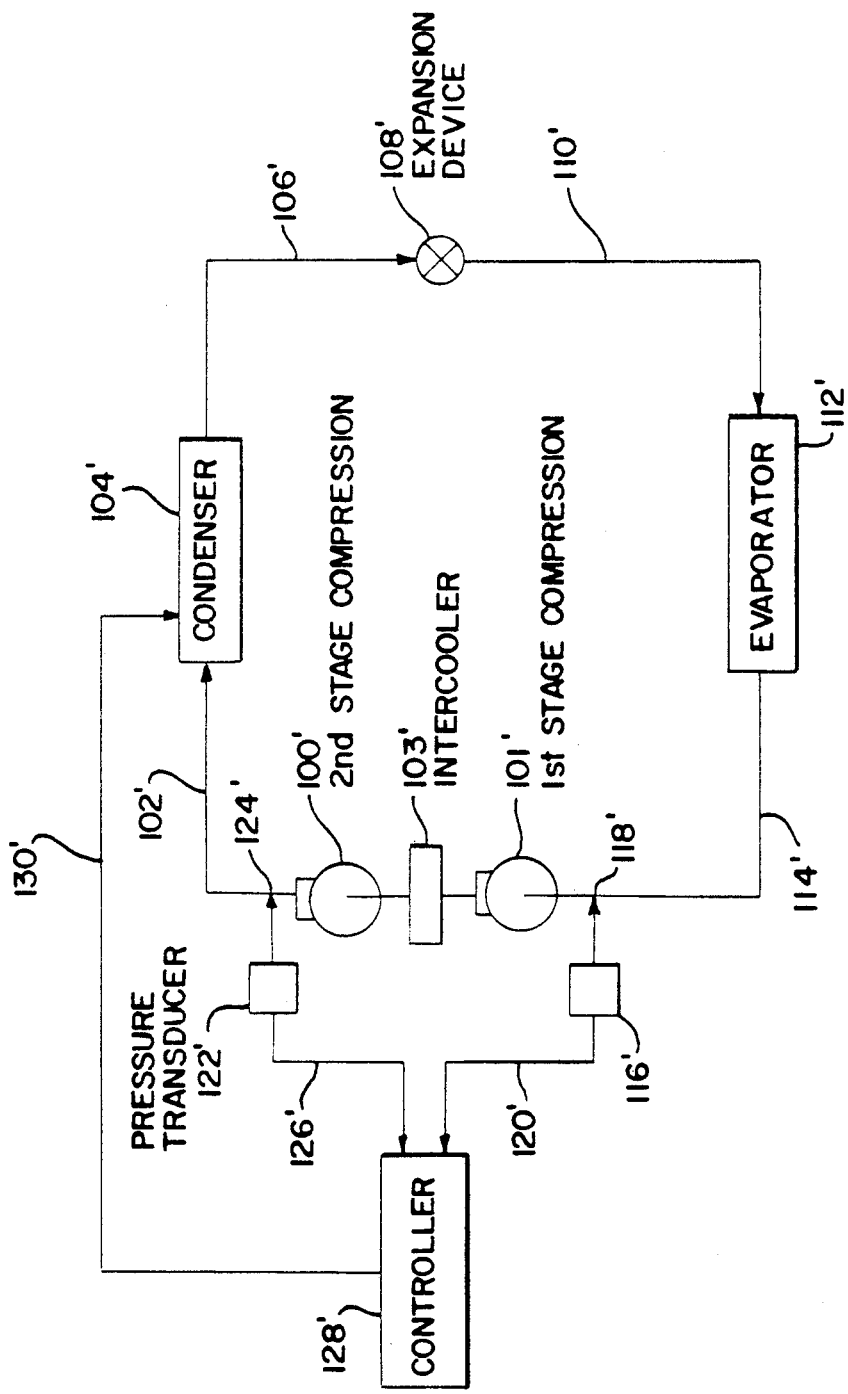
FIG. 3 is a schematic diagram showing one configuration of a two stage compressor refrigeration system utilizing the present invention.

The present invention could be used to control the discharge line pressure in a two, or multiple, stage compressor refrigeration system. FIG. 3 is a schematic diagram of a two stage compressor refrigeration system utilizing the present invention. Note that the compressor means 100 illustrated in FIG. 2, has been replaced in the system shown in FIG. 3 by a first stage compressor 101', an intercooler 103', and a second stage compressor 100', which are all connected in series. In this two stage system, the present invention is used to control the discharge line pressure of the working fluid in line 102' by treating the two compressors, 101' and 100', as a single compressor. Pressure sensing device 116' measures the suction pressure of the working fluid at location 118' just prior to the working fluid entering the first stage compressor 101'. Pressure sensing device 122' measures the discharge line pressure of the working fluid at location 124', just after the outlet of compressor 100'. In this two stage system, the present invention would operate in the same manner as has been previously described, except that the internal pressure ratio which must be inputted to and stored in the controller would be the product of the internal pressure ratios for the first and second stage compressors.

Figure 4:
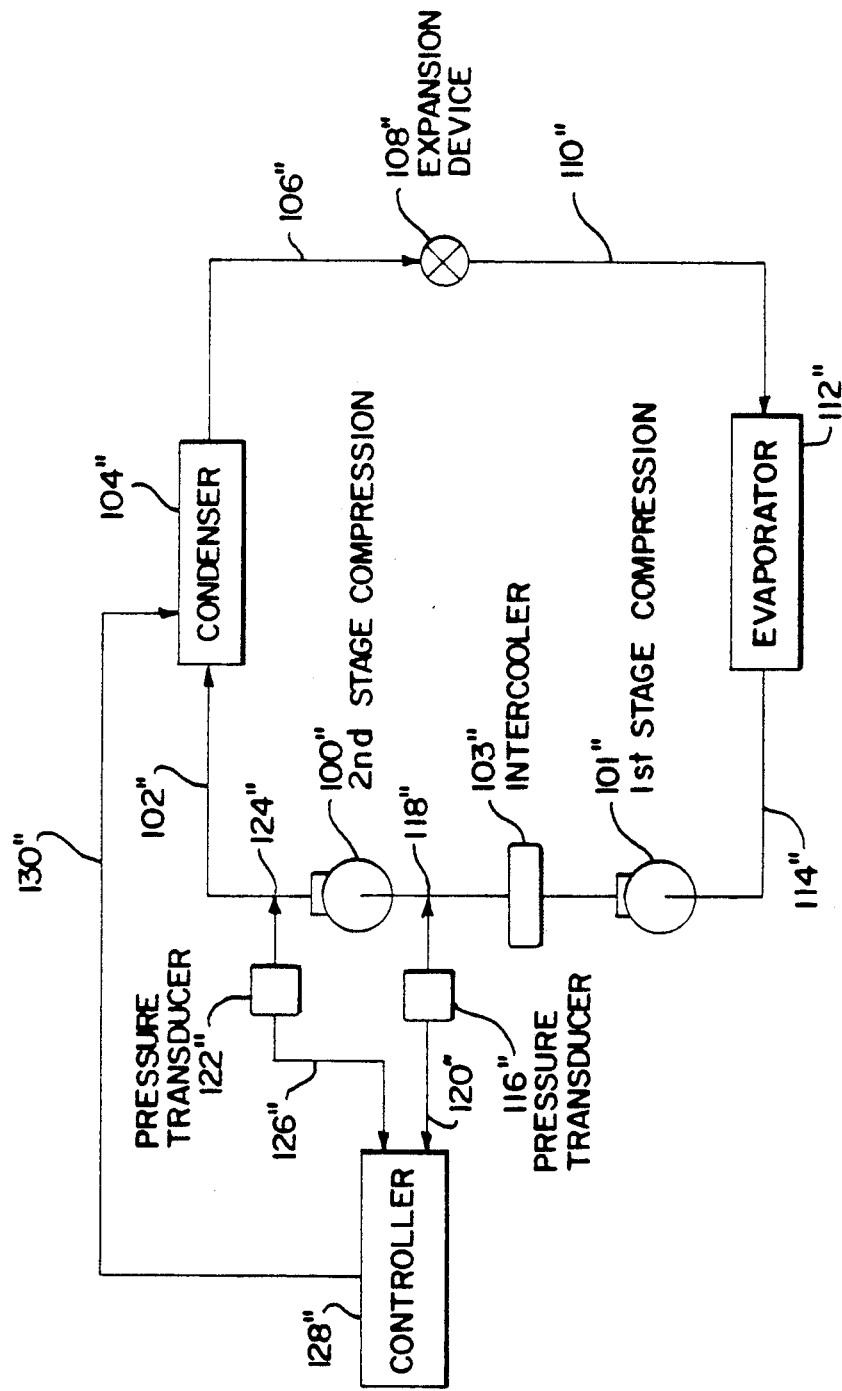
FIG. 4 is a schematic diagram showing an alternative configuration of a two stage compressor refrigeration system utilizing the present invention.

However, it is not required in the operation of the present invention in a two, or multiple stage compressor refrigeration system that the operation of the two or more compressors be combined and treated as one. Rather, the present invention can be used in a multiple stage compressor refrigeration system to control the discharge line pressure based only on the operation of the last stage compressor as illustrated in the schematic diagram of FIG. 4. In this diagram, the compressor means is shown to consist of first stage compressor 101", intercooler 103", and second stage compressor 100", all of which are connected in series. However, in this system, pressure measuring device 116" measures the suction pressure of the working fluid at location 118", which is just prior to the inlet of the second stage compressor 100", and pressure sensing device 122" measures the discharge line pressure at location 124", just after the outlet of the second stage compressor 100". In this case, the present invention would operate in the same manner as described previously except that the internal pressure ratio which is inputted and stored in the controller 128" would be the pressure ratio for only the second stage compressor.

The operation of the preferred embodiment of the present invention can best be illustrated by the following example. In this example, the operation of the present invention will be illustrated for use in a two stage screw compressor system with multiple cell condensers. Both compressor will be combined for the purposes of this example and treated as one. Further, it will be assumed that the first stage compressor has an internal pressure ratio of 2.6 and the second stage compressor has an internal pressure ratio of 2.8. As a result, the total pressure ratio for the compressor system would be equal to 2.6×2.8=7.3. In addition, it will be assumed that the suction pressure remains constant and equal to 29.0 psia.

Figure 5:
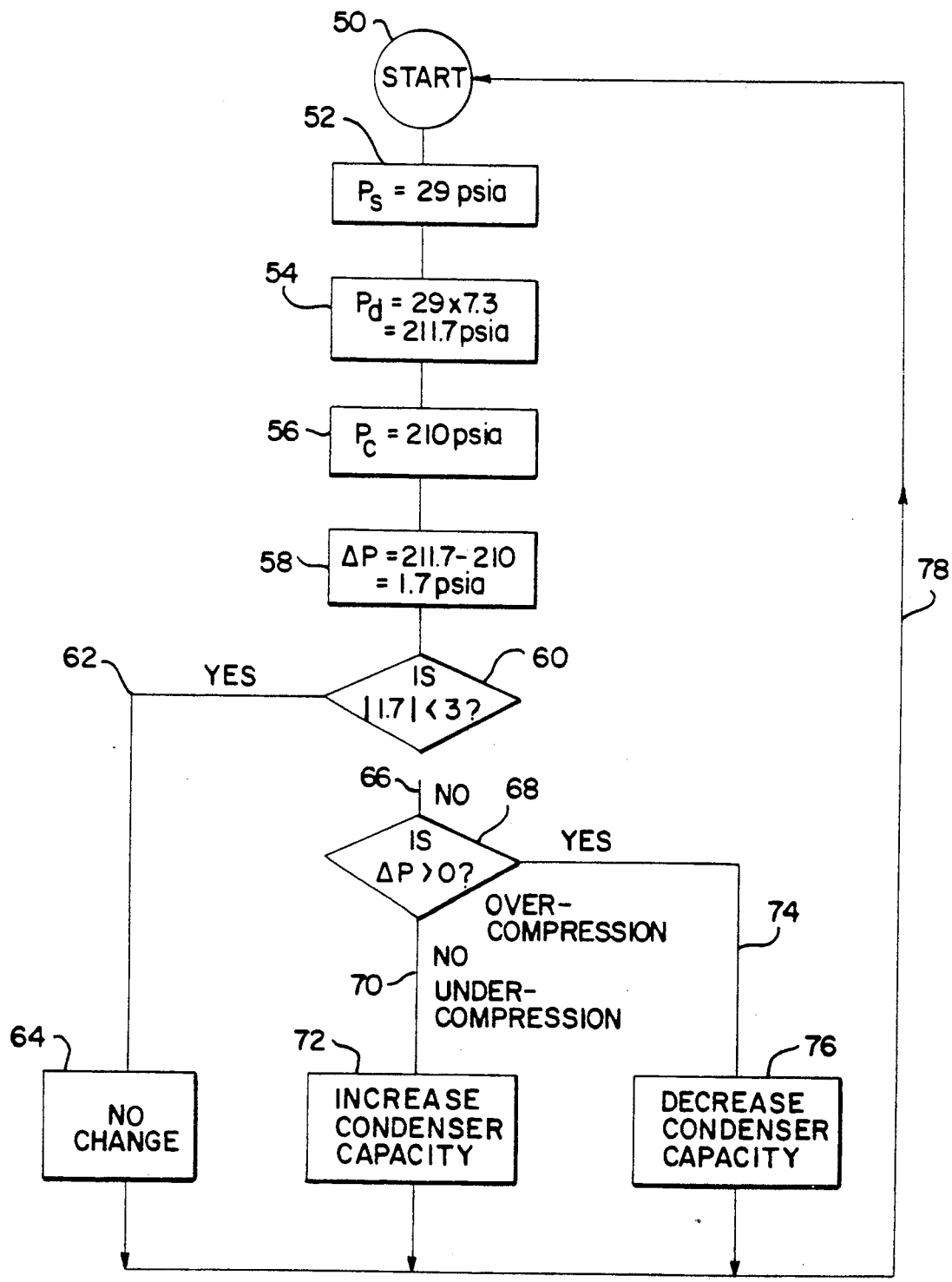
FIG. 5 is a flow chart block diagram illustrating the operation of the control logic of the present invention for the case of ideal compression.

Referring now to FIG. 5, the operation of the present invention will be explained for the ideal compression case which occurs when the discharge line pressure is within the pre-set tolerance of the internal discharge pressure. As shown by block 52, the first step in the control sequence of the present invention is to measure the suction pressure of the refrigerant which is shown to be 29.0 psia. Next, the controller in block 54 calculates the internal discharge pressure of the compressor, $P_d$, by multiplying the suction pressure by the internal pressure ratio, $P_i$, which is shown in the figure as 29.0 psia $\times 7.3 = 211.7$ psia.

The discharge line pressure is then measured as shown by block 56. To illustrate the operation of the present control device in this first mode, it will be assumed that the ambient conditions are close to the design conditions for the system and that at these conditions, the discharge line pressure is equal to 210 psia as indicated. In block 58, the controller then subtracts this discharge line pressure, $P_c$, from the internal discharge pressure, $P_d$, to determine the difference between these pressures, $\Delta P$, which is shown to be equal to $211.7 - 210 = 1.7$ psia. The controller then compares the absolute value of this 1.7 psia pressure difference to the preset tolerance of the system in decision block 60 to determine if the pressure difference is less than this tolerance. In this example, assume that the tolerance is 3 psia. As a result, the pressure difference is less than the tolerance and the controller then follows path 62 to block 64 in which no signal is sent to the condenser to change the capacity. The controller then follows path 78 back to the start of the controller logic sequence 50 and begins the control sequence over again.

Figure 6:
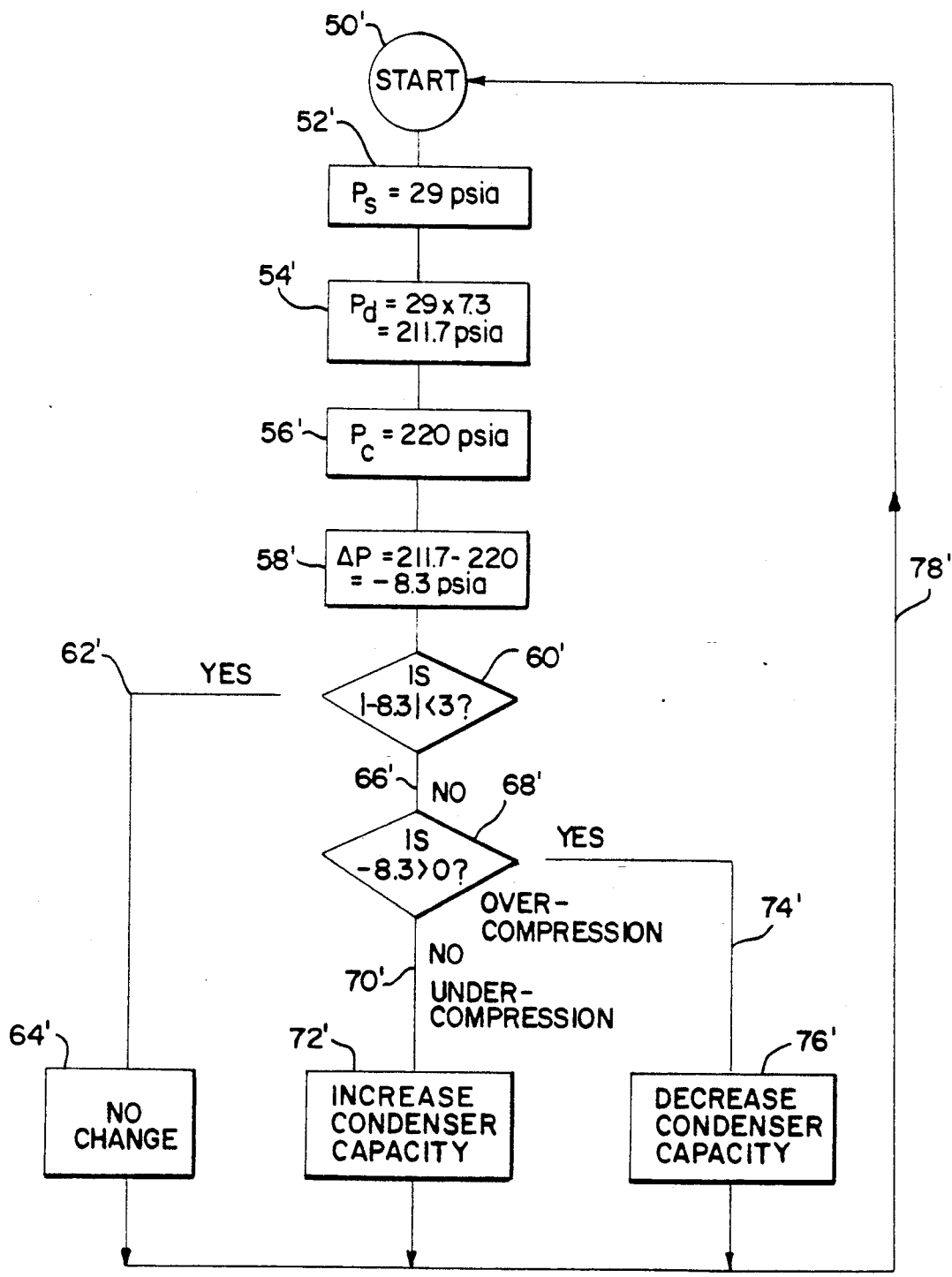
FIG. 6 is a flow chart block diagram illustrating the operation of the control logic of the present invention for the case of under-compression.

Referring now to FIG. 6, the operation of the present invention will be explained for the case where undercompression exists, that is, when the discharge line pressure is greater than the internal discharge pressure of the compressor. This situation could commonly arise during the morning hours when the ambient temperature is relatively low. During these low ambient temperature operating times, the system will not require its full condensing capacity to maintain the discharge line pressure close to the internal discharge pressure of the compressor. However, as the ambient temperature increases, the condensing pressure and discharge line pressure will also increase causing a condition of undercompression. This condition will continue until additional condensing capacity is brought on-line to reduce the discharge line pressure.

For the purposes of this example, it will be assumed that the suction pressure is still 29 psia as shown in block 52'. Accordingly, since the internal pressure ratio remains constant, the calculated internal discharge pressure is still equal to 211.7 psia as shown in block 54'. However, since the ambient temperature has now increasing from a relatively low level, the discharge line pressure has also increased and in fact, is shown as 220 psia in block 56'. The calculated $\Delta P$ in block 58' is now equal to $-8.3$ psia. As a result, in decision block 60', the absolute value of $\Delta P$ is greater than the pre-set tolerance of 3 psia so the controller follows path 66' to the second decision block 68'. In this decision block 68', it is determined that $-8.3$ is less than zero such that the controller follows path 70', which is the under-compression path, to block 72' wherein the controller outputs a signal to the condenser to increase the capacity in order to lower the discharge line pressure and bring it within the preset tolerance. Upon leaving decision block 72', the controller follows path 78' back to start block 50'.

Figure 7:
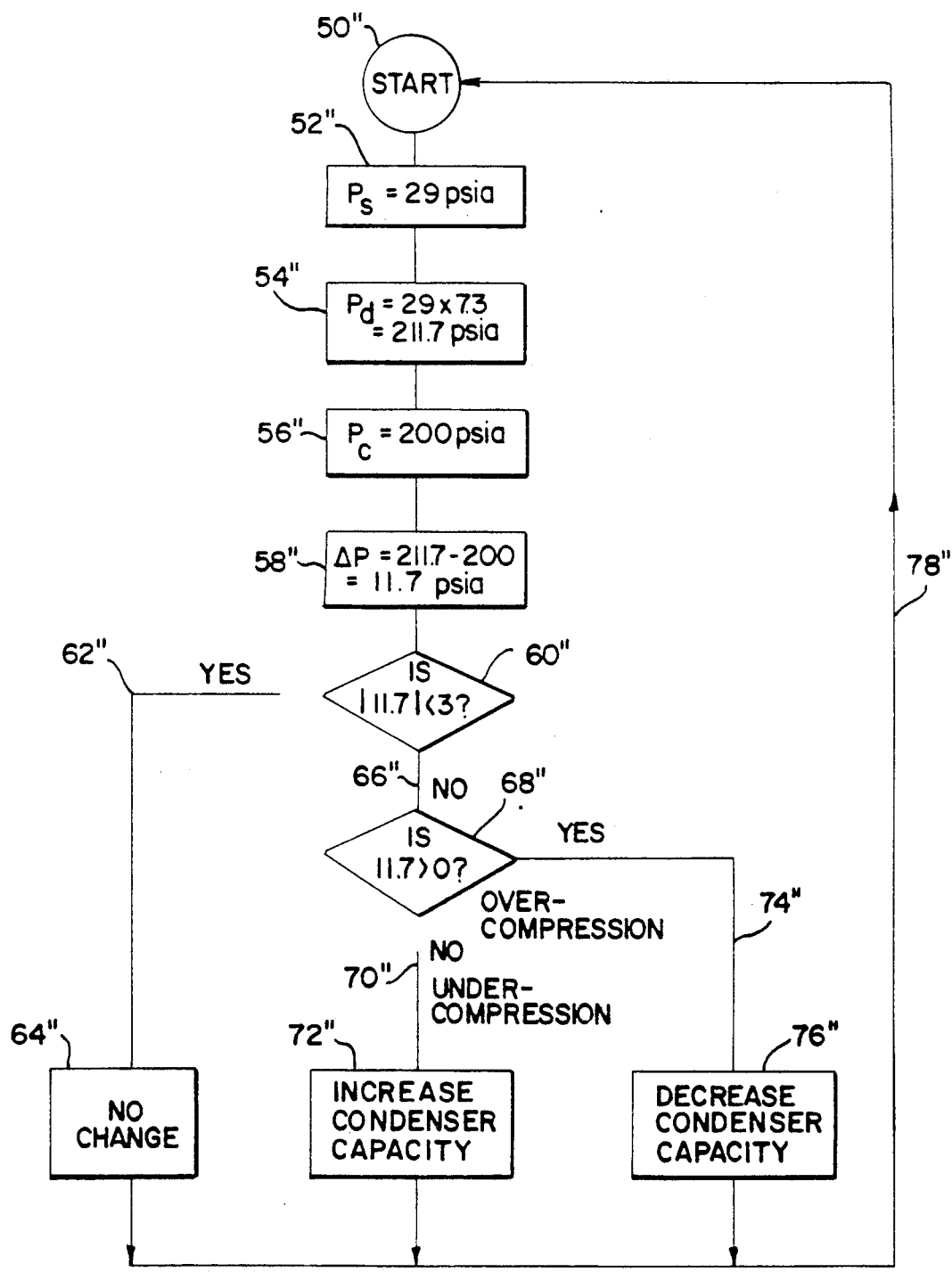
FIG. 7 is a flow chart block diagram illustrating the operation of the control logic of the present invention for the case of over-compression.

Referring now to FIG. 7, the operation of the present invention will be explained for the case where over-compression exists, that is, when the discharge line pressure is less than the internal discharge pressure of the compressor. This situation could arise during the evening hours as the ambient temperatures begin to fall from their peak, mid-day levels. During the time when the ambient temperature is at its highest level for the day, the refrigeration system could require the maximum available condensing capacity to maintain the discharge line pressure close to the internal discharge pressure of the condenser. However, as the ambient temperatures begin to fall, the condensing pressure and the discharge line pressure will also fall, assuming the refrigeration load remains constant. This drop in discharge line pressure could cause the condition of overcompression which will continue until the condensing capacity is reduced in order to effect an increase in the discharge line pressure.

As before, it will be assumed that the suction pressure has remained constant and, therefore, is still shown as 29 psia in block 52''. Accordingly, since the internal pressure ratio remains constant, the calculated internal discharge pressure is still equal to 211.7 psia as shown in block 54''. However, since the ambient temperature has fallen from its previous high levels, the discharge line pressure has also fallen and, in fact, is shown as 200 psia in block 56''. The calculated $\Delta P$ in block 58'' is now equal to 11.7 psia. As a result, in decision block 60'', the absolute value of $\Delta P$ is greater than the pre-set tolerance of 3 psia so the controller follows path 66'' to the second decision block 60''. In this decision block 60'', it is determined that 11.7 is greater than zero such that the controller follows path 74', which is the over-compression path, to block 76' wherein the controller outputs a signal to the condenser to decrease the capacity. This decrease in condenser capacity will effect an increase in the discharge line pressure such that the discharge line pressure is brought within the pre-set tolerance. This condenser capacity decrease could be easily achieved as described previously by slowing down the fan motors, turning off some fans, or closing the fan dampers. Upon leaving decision block 76', the controller follows path 78' back to start block 50'.

While the operation of the present invention has been described when used with a screw compressor refrigeration system, it should be obvious to those skilled in the art that the present invention could find application on any refrigeration or air conditioning system which utilizes fixed or variable volume ratio compressors. Further, the present invention would be able to provide energy savings with any type of condenser operation that has multiple control steps which can be used to reduce energy input as capacity is decreased. Various modifications may be made without departing from the scope and intent of the invention which is defined in the following claims.

I claim:
1. A method of controlling the head pressure in a refrigeration or air conditioning system comprising the steps of:
    measuring a suction pressure of a working fluid at a point just prior to the working fluid entering a compressor means,
    converting said suction pressure into a first signal,
    transmitting said first signal to a controller means, calculating an internal discharge pressure of the compressor by multiplying the first signal representing the suction pressure by a signal representing the internal pressure ratio of the compressor, measuring a discharge line pressure of the working fluid at a point just after the compressor means outlet, converting said discharge line pressure into a second signal, transmitting said second signal to the controller means, then comparing the calculated internal discharge pressure with the second signal representing the discharge line pressure;

if the absolute value of the difference between the internal discharge pressure and the discharge line pressure is less than a pre-set tolerance, operating in a first mode whereby the controller means does not output any control signal to change the capacity of the condenser means, if the absolute value of the difference between the internal discharge pressure and the discharge line pressure is greater than the pre-set tolerance, and if the internal discharge pressure is greater than the discharge line pressure, operating in a second mode to decrease the capacity of the condenser means, thereby increasing the discharge line pressure to within the pre-set tolerance of the internal discharge pressure, and if the absolute value of the difference between the internal discharge pressure and the discharge line pressure is greater than the pre-set tolerance, and if the internal discharge pressure is less than the discharge line pressure, operating in a third mode to increase the capacity of the condenser means, thereby decreasing the discharge line pressure to within the pre-set tolerance of the internal discharge pressure.

2. The method of claim 1 wherein the compressor means may be a screw, rotary vane, or scroll compressor.

3. The method of claim 2 wherein the screw compressor may have a fixed or variable volume ratio.

4. The method of claim 1 wherein the working fluid is a refrigerant.

5. The method of claim 1 wherein the compressor means consists of two or more distinct compressor devices and wherein the internal pressure ratio is equal to the product of the individual internal pressure ratios for each distinct compressor devices.

6. The method of claim 1 wherein the compressor means is the last stage compressor in a multiple compressor system and wherein the internal pressure ratio is the internal pressure ratio of said last stage compressor.

7. An apparatus to control the head pressure in a refrigeration or air conditioning system comprising a compressor means having an inlet and outlet for a working fluid, a condenser means having an inlet and an outlet for a working fluid, said inlet connected to the compressor means outlet, a working fluid expansion device having an inlet and outlet for a working fluid, said inlet connected to the condensing means outlet, an evaporator means having an inlet and outlet for a working fluid, said inlet connected to the expansion device outlet and said evaporator means outlet connected to the compressor means inlet, the improvement comprising a first pressure sensing means to measure a suction pressure of the working fluid at a point just prior to the compressor means inlet and to communicate said suction pressure to a controller means, a second pressure sensing means to measure a discharge line pressure of the working fluid at a point just after the compressor means outlet and to communicate said discharge line pressure to a controller means, a controller means to receive communications from the first and second pressure sensing means, to calculate an internal discharge pressure of the compressor means by multiplying the suction pressure by a previously inputted internal pressure ratio, and to compare the internal discharge pressure to the discharge line pressure;

if the absolute value of the difference between the internal discharge pressure and the discharge line pressure is less than the pre-set tolerance, operating in a first mode whereby the controller means does not output any control signal to change the capacity of the condenser means, if the absolute value of the difference between the internal discharge pressure and the discharge line pressure is greater than the pre-set tolerance, and if the internal discharge pressure is greater than the discharge line pressure, operating in a second mode whereby the controller means sends a control signal to decrease the capacity of the condenser means, and if the absolute value of the difference between the internal discharge pressure and the discharge line pressure is greater than the pre-set tolerance, and if the internal discharge pressure is less than the discharge line pressure, operating in a third mode whereby the controller means sends a control signal to increase the capacity of the condenser means.

8. The apparatus of claim 7 wherein the compressor may be a screw, rotary vane, or scroll compressor.

9. The apparatus of claim 8 wherein the screw compressor may have a fixed or variable internal volume ratio.

10. The apparatus of claim 7 wherein the working fluid is a refrigerant.

11. The apparatus of claim 7 wherein the compressor means consists of two or more distinct compressor stages and wherein the first pressure sensing device measures the suction pressure of the working fluid at a point just prior to a first compressor stage inlet and wherein the second pressure sensing device measures the discharge line pressure just after a last compressor stage outlet and wherein the previously inputted internal pressure ratio is equal to the product of the individual internal pressure ratios of each compressor stage.

12. The apparatus of claim 7 wherein the compressor means consists of two or more distinct compressor stages and wherein the first pressure sensing device measures the suction pressure of the working fluid at a point just prior to a last compressor stage inlet and wherein the second pressure sensing device measures the discharge line pressure just after the last compressor stage outlet and wherein the previously inputted internal pressure ratio is equal to the internal pressure ratio of the last compressor stage.

* * * * *